May 18, 1943 L. E. DAVIES 2,319,214
SEALING APPARATUS
Filed April 17, 1940 2 Sheets-Sheet 2
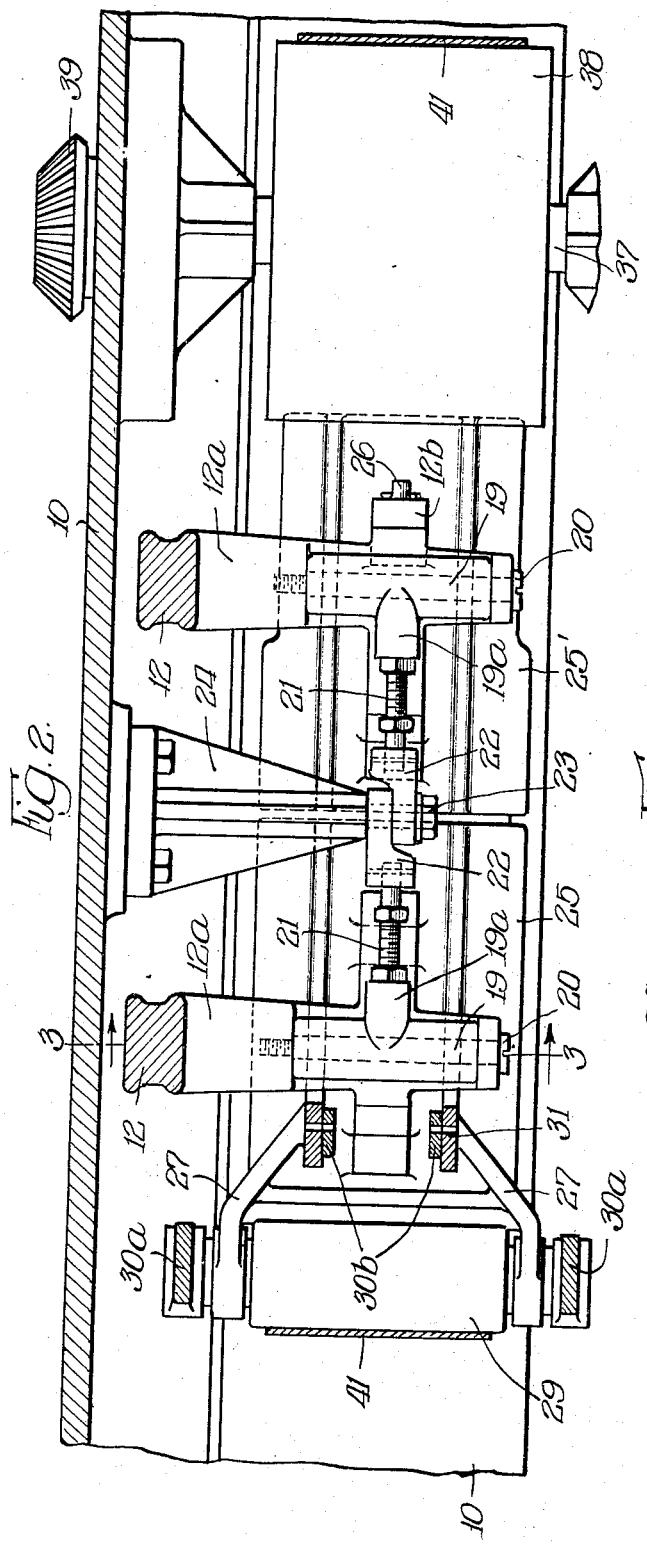
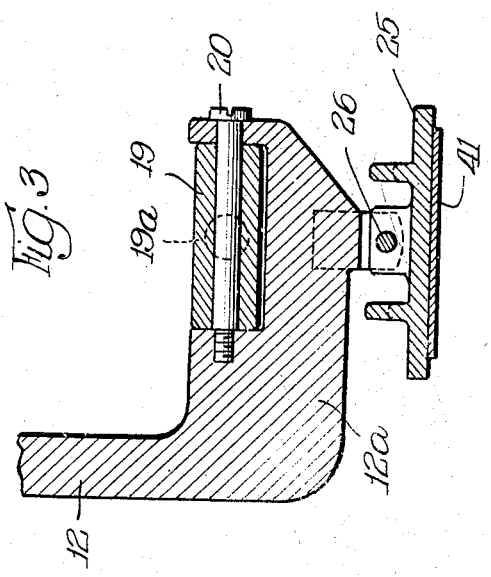
INVENTOR.
Lynn E. Davies,
BY
ATTORNEYS.

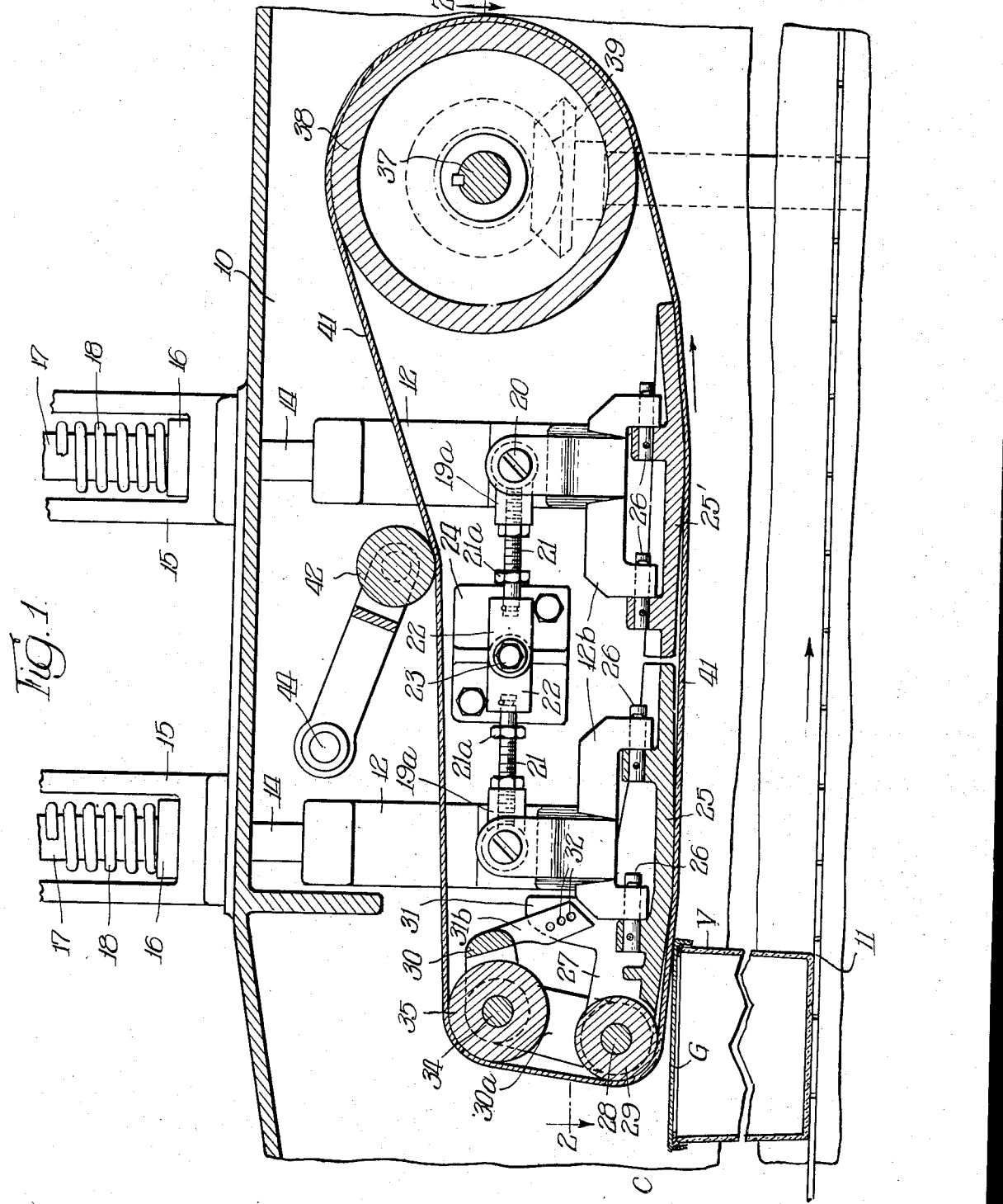

Patented May 18, 1943

UNITED STATES PATENT OFFICE 2,319,214

SEALING APPARATUS

Lynn E. Davies, Park Ridge, Ill., assignor to White Cap Company, Chicago, Ill., a corporation of Delaware Application April 17, 1940, Serial No. 330,032

17 Claims. (Cl. 226—80)

This invention relates to apparatus for the sealing of closure caps, lids or covers on packing vessels such as jars or cans, and it relates particularly to the type of apparatus wherein the lid or cover is sealed or seated on the packing vessel by being pressed downwardly thereon while the vessel is being moved progressively. It is adapted for use in sealing machines of the types illustrated in the patents to White Nos. 1,920,539 and 2,041,891, as well as in other sorts of machines.

Various types of apparatus have been provided for seating or sealing closures on vessels by operations of the sort above mentioned, and as a rule they include a conveyor for moving the vessel progressively and a pressure applying device operating above the conveyor and having a continuously movable endless belt traveling above the conveyor and at the same speed, which belt is adapted to engage the closure which is on the vessel and transmit to it the pressure for moving it to sealed or seated position.

The extent to which the closures must be moved or displaced vertically in order to move them to sealed or seated position on the vessel varies quite considerably as between different kinds or types of closures. It is customary to employ some sort of sealing gasket or inlay of plastic material in order to form an hermetic seal between the closure and the vessel. In instances where such sealing gasket or inlay is quite thin, the extent of vertical displacement of the closure on the vessel must be limited to only a fraction of the thickness of the sealing material, else the rim of the vessel may be forced completely through it and its purpose of forming and maintaining a secure hermetic seal be defeated. Packing vessels are necessarily subject to some unevenness in the height of their mouth rims or irregularity in the contour thereof, and there may be some unevenness as between the height of opposite sides of a vessel due to its resting on a particle of foreign matter on the conveyor. Such factors are likely to cause imperfect or unreliable seals.

It is a general object of the present invention to provide an improved sealing mechanism of the type above specified which is particularly adapted for operation on vessels and closures wherein the sealing gasket or inlay is quite thin, for example, a sixteenth of an inch or less, and which is specially qualified to accommodate unevenness in height as between different sides of the vessel and effect adequate and substantially uniform intrusion of the vessel rim into the sealing material while avoiding a complete penetration of the latter.

Another object is the provision of such an apparatus which will operate automatically and with certainty and precision to obtain the above specified results on vessels and closures which are being moved rapidly and in close succession.

Other and further objects of the invention will be pointed out or indicated hereinafter or will be apparent to one skilled in the art upon an understanding of the present disclosure or its employment in actual practice.

For the purpose of aiding in an explanation of the invention, I show in the accompanying drawings forming a part of this specification, and hereinafter describe, a certain form in which the invention may be embodied. It is to be understood, however, that this is presented merely for purpose of illustration and hence is not to be construed in any fashion for the purpose of limiting the appended claims short of the true and most comprehensive scope of the invention in the art.

In said drawings,

Fig. 1 is a longitudinal vertical sectional view of apparatus embodying the invention;

Fig. 2 is a horizontal sectional view taken on approximately line 2—2 of Fig. 1; and Fig. 3 is a transverse sectional view taken on approximately line 3—3 of Fig. 2.

Referring to the particular mechanism illustrated in the drawings, let it be understood that the reference numeral 10 designates generally a casing portion of a machine as, for example, a machine of the type illustrated in the above identified patents, which casing affords a tunnel through which runs the upper flight 11 of an endless conveyor belt which is moved in the direction indicated by the associated arrow. This belt is adapted to afford a support for a series of packing vessels, one of which is indicated at V, and to move same through the tunnel with a continuous progressive movement.

A pair of hangers 12 is supported on the casing 10 by means of rods 14, which extend slidably through the top of the casing and into spring cages 15 mounted thereon. The rods 14 have screw-thread engagement with nuts 16, which are carried on the lower ends of tubes 17 and pressed downwardly by coil springs 18. The nuts 16 may be rotated by means of the tubes 17, thereby to adjust the rods 14 upwardly or downwardly in the nuts and tubes, thus to vary the lower limit position of the hangers 12, which is established by the engagement of the nuts 16 against the bottoms of the spring cages. Each hanger, including its rod 14 and tube 17, is individually movable upwardly, however, against the pressure of its spring 18.

The vertically extending shanks of the hangers pass downwardly adjacent the wall of the casing 10, and at their lower ends carry laterally projecting foot portions 12a, as seen in Figs. 2 and 3, which extend transversely above the conveyor belt. These foot portions are grooved to accommodate the hub portions 19 of shackles, which are rotatably mounted on the hangers by means of pintle bolts 20. These shackles have bosses 19a extending laterally from their hubs and tapped for screw-thread engagement with adjusting screws 21. These screws are rotatably anchored in heads 22 which are secured to a bracket 23 by means of a bolt 25 in such fashion that the heads may have a limited oscillatory movement upwardly and downwardly. The screws 21 may be rotated by means of their flatted collars 21a to adjust them into and out of the shackle bosses 19a and thus control the spacing between the shoes and vary their longitudinal inclination slightly. These screws and the shackles also act as struts or radius rods between the hanger feet 12a and the bracket 24 for the purpose of holding the hangers and their rods 14 against rotation and against being moved by the drag of the belt.

On the lower portions of the hanger foot members 12a are formed, or rigidly affixed, shoe mountings 12b, which occupy positions over approximately the median line of the conveyor belt 11, and shoes 25, 25' are suspended on said mountings 12b by means of journal pins 26 disposed over the median line of the conveyor belt and adapted to permit the shoes to oscillate in the lateral directions. I will refer to the shoe 25 as the entering shoe, as it is the one under which the approaching vessels first enter, and I will refer to the shoe 25' as the trailing shoe. I will also use the terms "forward" and "rearward" in accordance with the direction of the travel of the vessels.

At its rearward extremity, the entering shoe carries arms 27, in the rear end portions of which is mounted an axle 28 upon which is journaled a lower roller 29. Also journaled on the axle 28 are the lower legs 30a of a rocking yoke 30, which has strut arms 31b adapted to be fixed to lugs 31 of the shoe at any of various elevations by means of a pin seated in one or another of the apertures 32. The yoke 30 carries an axle 34 upon which is journaled an upper roller 35. Swinging of the yoke 30 to its various positions of adjustment moves the upper roller 35 rearwardly or forwardly relative to the roller 29.

In suitable bearings supported on the side walls of the housing 10 is journaled a shaft 37 which carries a pulley 38, said shaft being driven in timed relationship with the conveyor belt 12 through the medium of suitable driving mechanism 39.

Entrained on the pulley 38 and the rollers 29 and 35 is the sealing belt 41 which is made of strong and firm material but which is flexible. The driving arrangement is such that this belt is driven in the direction indicated by the associated arrow at the same rate of linear speed as is the conveyor belt 11. The lower flight of this sealing belt travels under and rides in contact with the smooth lower surface portions of the shoes 25 and 25', against which it is held by the pressure of the belt tightener roller 42, which is hinged at 44 on the side wall of the housing. The shoes 25 and 25' thus establish the position and elevation of the lower flight of the sealing belt. For a distance from its rearward end the lower surface of the entering shoe 25 slopes downwardly and forwardly from the roller 29, and adjacent the forward end of the trailing shoe 25' its lower surface slopes upwardly and forwardly. Also, for a distance adjacent their proximate ends the lower surfaces of the two shoes are sloped in anticlinal relationship. As a consequence, the lowest portion of the under surface of each shoe is spaced some distance from both its ends.

For operation upon containers of a given height, the hangers 12 are set at such a vertical adjustment that when a vessel V with its closure cap C is moved below the lowest portion of shoe 25 by the feeding movement of conveyor belt 11 and sealing belt 41, the closure cap will be pressed downwardly on the vessel for the purpose of effecting the hermetic seal. In preparation for such operation, the vessel V, with its intended contents, is placed upon the conveyor belt 11 at a suitable location, and, usually after displacement or rarefaction of air from the head space of the vessel and the cavity of the closure cap, the latter is placed upon the vessel with its sealing gasket G resting on the mouth rim thereof. Consequently, in order to effect the hermetic seal, the downward displacement of the closure cap on the vessel need be only an amount sufficient to intrude or imbed the mouth rim slightly in the gasket throughout the entire circumference of the mouth rim. However, in order to form an hermetic seal, it is essential that a proper intrusion or contact of the mouth rim upon the gasket entirely around the mouth of the vessel be effected.

In certain types of closures it is quite desirable that the gasket or inlay of sealing material be quite thin, and since excess downward displacement of the closure on the vessel might force the mouth rim entirely through the gasket, and thus prevent formation of an hermetic seal, it becomes necessary to limit and control the downward displacement of a thin-gasket closure quite definitely, not only to obtain adequate imbedment or contact, but also to avoid excess penetration in event the rim of the vessel is higher at one side than it is at the other. Such a circumstance might be caused by inaccuracy in the form of the vessel itself, in which respect certain established tolerances are recognized and provided for, or by a lateral slope of one of the conveyor belt sections, or because of foreign material between the bottom of the vessel and the conveyor belt.

The present mechanism accomplishes this control through automatic accommodation of the closure seating mechanism to such an irregular position of the vessel. By virtue of the rocking or oscillatory support of the entering shoe 25 on the shoe mounting 12b, its inclination in the lateral directions may be changed automatically, and this will accomplish a similar change in the lateral inclination of the roller 29. The forwardly inclined position of the lower flight of the belt between the roller 29 and the low point of the entering shoe 25 is held downwardly slightly away from the overlying sloping surface of the shoe, and this allows the vessel and its closure a smooth, gradual and unobstructed entry under the sealing belt and shoe. Consequently, if the vessel itself is in a laterally tilted position or if its mouth rim is higher at one side than at the other, the closure cap will occupy a correspondingly tilted or canted position, and as the vessel and closure move under the entering portion of the sealing belt 41, it and the entering shoe 25 will be given a corresponding tilt before the closure reaches the low point of the shoe where the sealing pressure is applied to it, with the result that when the vessel and closure pass under the lowermost portion of the shoe, the sealing pressure will be applied uniformly to the closure cap over the gasket and the mouth rim of the vessel, instead of being concentrated on the higher side. This lateral tilting adjustment of the shoe to the cant of the mouth rim of the vessel is accomplished before the actual sealing pressure is applied because of the gradual entry of the sloping closure cap into contact with the belt rearwardly of the low point of the shoe.

As a result of this automatic accommodation of the mechanism to the vessel, a substantially uniform imbedment or contact of the mouth rim of the vessel upon the gasket is effected, as distinguished from an excessive penetration at one side and an inadequate contact at the other.

The relieving anticline at the forward end of the entering shoe and the rearward end of the trailing shoe is to permit the sealed vessel to pass under the latter without any resistance or obstruction from its rearward end, and also to permit the entering shoe to accommodate its lateral inclination to the following vessel even before its predecessor has passed entirely from under said shoe. However, in such period of transition the closure cap is still held down by the belt 41 in this relieved zone. Of course, as the sealed vessel passes under the trailing shoe 25', said shoe likewise accommodates itself to the lateral slope of the closure cap, which it is free to do quite independently of the entering shoe 25, which at such time may have a quite different lateral slope under the influence of a following vessel. As the sealed vessels leave the forward end of the trailing shoe 25', they are carried on by the conveyor 11 to the location where they are removed from it.

If, for any reason, a vessel is presented with its mouth rim at an excessive elevation, its passage beneath the shoes is accommodated by upward movement of the hangers 12 against the pressure of their springs 18, each shoe being susceptible of such movement independently of the other, and such movement being accommodated by the rotatable mounting of the shackles 19 and bolt eyes 22. It will be appreciated also that in almost all instances where thin-gasket caps are being used, the lateral or tilting action of the shoes, as well as the vertical action of the hangers 12, is very slight and scarcely perceptible to the eye. However, it is by virtue of its provisions for a ready accommodation to these slight automatic adjustments that the apparatus is particularly qualified for its purpose.

I claim:

1. In a sealing machine wherein the containers to be sealed are moved progressively by conveyor means, a pressing device under which the containers are moved and which comprises, in combination, an endless flexible belt arranged to travel around horizontal axes and actuated to move its lower flight in the same direction and at the same speed as the containers are moved, shoe supporting means, and a plurality of shoes each extending across the belt and arranged to bear upon the upper surface of said lower flight, said shoes being disposed one ahead of another in the direction of movement of the containers and each being pivotally mounted on the shoe supporting means over the longitudinal median line of the lower flight so as to have transverse oscillatory movement on its supporting means independently of the others.

2. In a sealing machine wherein the containers to be sealed are moved progressively by conveyor means, a pressing device under which the containers are moved and which comprises, in combination, an endless flexible belt arranged to travel around horizontal axes and actuated to move its lower flight in the same direction and at the same speed as the containers are moved, a plurality of shoes pivotally mounted above the lower flight and each arranged to bear upon the upper surface thereof across the greater portion of its width and disposed one ahead of another in the direction of movement of the containers, the mounting of said shoes permitting them vertical movement independently of each other and transverse oscillatory movement independently of each other, means for tensioning the belt to press its lower flight against the shoes, and yielding means pressing the shoes downwardly.

3. In a sealing machine wherein the containers to be sealed are moved progressively by conveyor means, a pressing device under which the containers are moved and which comprises, in combination, an endless flexible belt arranged to travel around horizontal axes and actuated to move its lower flight in the same direction and at the same speed as the containers are moved, and a plurality of shoes arranged for engagement with the upper surface of said lower flight and disposed one ahead of another in the direction of movement of the containers, the mounting of said shoes permitting them vertical movement independently of one another and transverse oscillatory movement independently of one another, and including also a roller mounted on one of the shoes at the location where the containers enter below the belt, said roller affording a guide for the belt at said location.

4. In a sealing machine wherein the containers to be sealed are moved progressively by conveyor means, a pressing device under which the containers are moved and which comprises, in combination, an endless flexible belt arranged to travel around horizontal axes and actuated to move its lower flight in the same direction and at the same speed as the containers are moved, and a plurality of shoes arranged for engagement with the upper surface of said lower flight and disposed one ahead of another in the direction of movement of the containers, the mounting of said shoes permitting them vertical movement independently of one another and transverse oscillatory movement independently of one another and the lower surfaces of the respective shoes which cooperate with the belt being shaped so that they slope first downwardly and then upwardly in the direction of travel of the containers.

5. In a sealing machine wherein the containers to be sealed are moved progressively by conveyor means, a pressing device under which the containers are moved and which comprises, in combination, an endless flexible belt arranged to travel around horizontal axes and actuated to move its lower flight in the same direction and at the same speed as the containers are moved, and a plurality of shoes arranged for engagement with the upper surface of said lower flight and disposed one ahead of another in the direction of movement of the containers, the mounting of said shoes permitting them vertical movement independently of each other, and a pair of rollers arranged one above the other and supporting and guiding the belt adjacent the location where the containers first enter under it, said rollers being mounted for vertical movement with the adjacent shoe and the upper, one of said rollers being adjustable about the axis of the other.

6. In a sealing machine wherein the containers to be sealed are moved progressively by conveyor means, a pressing device under which the containers are moved and which comprises, in combination, an endless flexible belt arranged to travel around horizontal axes and actuated to move its lower flight in the same direction and at the same speed as the containers are moved, and a plurality of shoes arranged for engagement with the upper surface of said lower flight and disposed one ahead of another in the direction of movement of the containers, the mounting of said shoes permitting them vertical movement independently of each other and transverse oscillatory movement independently of each other, and a pair of rollers arranged for supporting and guiding the belt adjacent the location where the containers first enter under it, said rollers being mounted for vertical movement with the adjacent shoe and one of said rollers being mounted above the other and being adjustable about the axis of the latter.

7. In a sealing machine wherein the containers to be sealed are moved progressively by conveyor means, a pressing device under which the containers are moved and which comprises, in combination, an endless flexible belt arranged to travel around horizontal axes and actuated to move its lower flight in the same direction and at the same speed as the containers are moved, a plurality of shoes arranged for engagement with the upper surface of said lower flight and disposed one ahead of another in the direction of movement of the containers, the mounting of said shoes permitting them vertical movement independently of each other and transverse oscillatory movement independently of each other, and means for adjusting at least one of said shoes toward and from another in the horizontal direction.

8. In a sealing machine wherein the containers to be sealed are moved progressively by conveyor means, a pressing device under which the containers are moved and which comprises, in combination, an endless flexible belt arranged to travel around horizontal axes and actuated to move its lower flight in the same direction and at the same speed as the containers are moved, a shoe arranged for engagement with the upper surface of said lower flight adjacent the location where the containers enter under the belt and having its lower surface at its entering end inclined in the direction of the containers' movement, and a belt guiding member mounted adjacent the entering end of the shoe and cooperating with the belt to restrain it normally out of engagement with said inclined lower surface portion of the shoe, said shoe being mounted to permit it oscillatory movement transversely of the belt.

9. A pressing device for sealing machines as specified in claim 8 and wherein the shoe is mounted for vertical movement against spring pressure and the belt guiding member is mounted for vertical movement with the shoe.

10. In a sealing machine wherein the containers to be sealed are moved progressively by conveyor means, a pressing device under which the containers are moved and which comprises, in combination, an endless flexible belt arranged to travel around horizontal axes and actuated to move its lower flight in the same direction and at the same speed as the containers are moved, and a plurality of shoes arranged for engagement with the upper surface of said lower flight and disposed one ahead of another in the direction of movement of the containers, the mounting of said shoes permitting them oscillatory movement transversely of the belt independently of one another, shoes which are adjacent each other having the lower surfaces of their juxtaposed portions sloping in anticlinal relationship longitudinally of the belt.

11. In a sealing machine wherein the containers to be sealed are moved progressively by conveyor means, a pressing device under which the containers are moved and which comprises, in combination, an endless flexible belt arranged to travel around horizontal axes with its lower flight traveling above the path of the containers and in the direction of their movement, a belt guiding member about which the belt is entrained at the location where the containers enter under it, said belt guiding member being mounted for vertical movement under spring pressure, a forward belt guiding member on which the belt is entrained over the location where the containers pass from under it, and a plurality of shoes arranged to bear upon the upper surface of the lower flight of the belt one ahead of another in the direction of its travel between said belt guiding members, the mounting of said shoes permitting them to have oscillatory movement transversely of the belt independently of one another.

12. A pressing device for sealing machines as specified in claim 11 and wherein the lowermost portions of the belt-engaging under surfaces of the respective shoes are remote from the ends of the shoes and normally restrain the belt out of engagement with portions of the shoes which are intermediate said lowermost surface portions.

13. In a pressing device for sealing machines as specified in claim 11 and wherein the lowermost belt-engaging portion of the shoe adjacent said belt guiding member is remote from said member and cooperates therewith to restrain the intervening portion of the belt normally out of contact with the shoe.

14. A pressing device for sealing machines as specified in claim 11 and wherein the respective shoes are mounted on different hangers and the hangers are individually movable vertically under spring pressure.

15. A pressing device for sealing machines as specified in claim 11 and wherein the respective shoes are mounted on different hangers and the hangers are individually movable vertically under spring pressure, and including also means for adjusting individual hangers longitudinally of the belt.

16. In a sealing machine wherein the containers to be sealed are moved progressively by conveyor means, a pressing device under which the containers are moved and which comprises, in combination, an endless flexible belt arranged to travel around horizontal axes with its lower flight traveling above the path of the containers and in direction of their movement, a hanger, a shoe mounted on said hanger and susceptible of oscillatory movement thereon transversely of the belt and having a lower surface portion arranged for bearing engagement upon the upper surface of the lower flight, and means for adjusting the lower portion of the hanger longitudinally of the belt to vary the longitudinal inclination of the shoe.

17. A pressing device for a sealing machine as specified in claim 16 and wherein the hanger is movable vertically under spring pressure.

LYNN E. DAVIES.

CERTIFICATE OF CORRECTION.

Patent No. 2,319,214. May 18, 1943.

LYNN E. DAVIES.

It is hereby certified that error appears in the printed specification of the above numbered patent requiring correction as follows: Page 2, first column, line 8, after "bracket" for the reference numeral "23" read --24--; same line, after "bolt" for "25" read --23--; and that the said Letters Patent should be read with this correction therein that the same may conform to the record of the case in the Patent Office.

Signed and sealed this 29th day of June, A. D. 1943.

(Seal)

Henry Van Arsdale,
Acting Commissioner of Patents.